June 4, 1963 L. E. SHOEMAKER 3,092,770

EMERGENCY LONG RANGE COMMUNICATION SYSTEM

Filed June 26, 1956 4 Sheets-Sheet 1

INVENTOR

Leslie E. Shoemaker,

BY George Sipkin

B. L. Zangwill

ATTORNEY

EMERGENCY LONG RANGE COMMUNICATION SYSTEM

Filed June 26, 1956 4 Sheets-Sheet 2

INVENTOR

Leslie E. Shoemaker,

BY George Sipkin

B. L. Zangwill

ATTORNEY

June 4, 1963 L. E. SHOEMAKER 3,092,770

EMERGENCY LONG RANGE COMMUNICATION SYSTEM

Filed June 26, 1956 4 Sheets-Sheet 3

INVENTOR

Leslie E. Shoemaker,

BY George Sipkin

B. L. Zangwill

ATTORNEY

INVENTOR
Leslie E. Shoemaker,
BY George Lipkin
B. L. Zangwill
ATTORNEY

United States Patent Office 3,092,770

Patented June 4, 1963

3,092,770
EMERGENCY LONG RANGE COMMUNICATION SYSTEM

Leslie E. Shoemaker, 1000 Springfield Road, Annandale, Va.

Filed June 26, 1956, Ser. No. 594,073
5 Claims. (Cl. 325—4)
(Granted under Title 35, U.S. Code (1952), sec. 266)

The invention described herein may be manufactured and used by or for the Government of the United States of America for governmental purposes without the payment of any royalties thereon or therefor.

This invention relates to an emergency ultra high frequency (UHF) communication system; and more particularly to a communication system for extending the range of ultra high frequency communications beyond the normal line of sight distances; and specifically to a communication system operable in the high latitude regions where ionospheric blackouts, sunspots, electromagnetic storms and high ambient noise levels cause serious interference problems.

Heretofore radio communications at medium and long distance was ordinarily carried out by equipment which propagated in the 3–30 mc. region. At these frequencies use of the sky wave, i.e., refraction of the radio wave by the ionospheric layer, permitted communication over considerable distances. At high latitudes however, disruption of the ionospheric layer by solar interference in most cases caused communication blackouts with this type of equipment.

The instant invention utilizes ultra high frequencies, or space waves, i.e., frequencies around 300 mc. and above which are not ordinarily refracted by the ionosphere thereby obviating the disadvantages of lower frequency equipment due to disruptions in the ionospheric layer. Since space waves do not propagate beyond the normal line of sight distances, the instant invention employs means for extending their range. Particularly this invention is directed to extending the UHF range to that obtainable with conventional equipment by utilizing a rocket containing a radio relay station or transponder. The rocket is fired from a transmitting or launching station, and, at the apogee of its flight, approximately 20 miles, the radio equipment therein becomes detached from the rocket body and is slowly lowered by parachute. In this suspended state transmissions from the launching station are received by the radio relay and retransmitted in a straight line to receiving stations beyond the normal line of sight. Conversely the distant station may transmit to the radio relay which will relay the intelligence down to the station which fired it. Inasmuch as the rocket rises very rapidly, communication may be established between stations almost immediately.

An object of the invention therefor is to provide a long range UHF communication system.

Another object of the invention is to provide a communication system operable in the high latitude regions which are invariably subject to ionospheric disturbances.

Still another object of the invenion is the provision of a rocket launched 2-way radio relay for rapidly establishing long range UHF communication.

A further object of the invention is the provision of a communication system for extending UHF communication ranges from ship to ship or ship to shore as well as for use in an emergency during ionospheric communication blackouts.

Other objects and many of the attendant advantages of this invention will be readily appreciated as the same becomes better understood by reference to the following detailed description when considered in connection with the accompanying drawings wherein.

Figure 1:
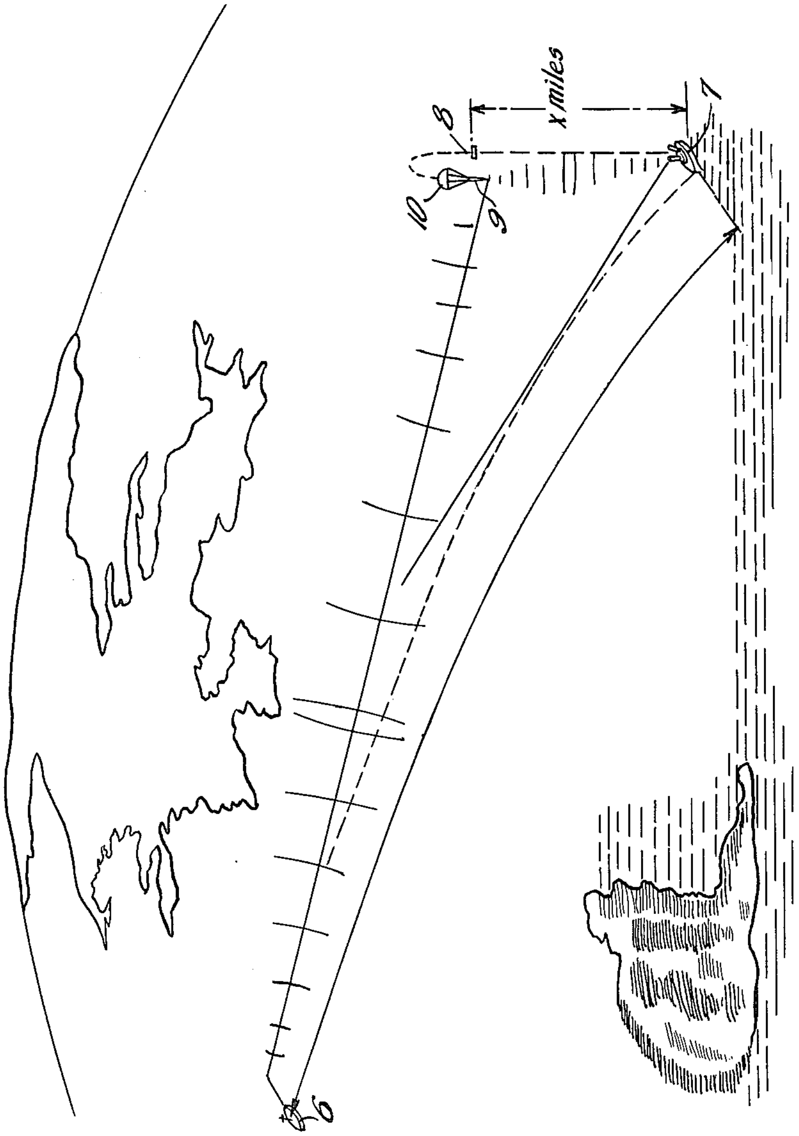
FIG. 1 is a perspective view of the long range UHF system.

Referring now to the drawings, wherein like reference characters designate like or corresponding parts throughout the several views, there is shown in FIG. 1, which illustrates a preferred embodiment, a ship or station 6 separated from a ship 7 a distance greater than the line of sight distance between them. Should ionospheric conditions be such that normal communication is not feasible, or if the ships are operating in the high latitude region where ionospheric disturbanances and magnetic storms are ever present; and communication becomes urgent, it may be accomplished between stations 6 and 7 only by means of UHF equipment which by its nature is not appreciably affected by ionospheric disturbances though its range is limited to line of sight distances. To extend the limited range of UHF one or both of the stations shown as ships 6 and 7 in FIG. 1 are adapted to launch a rocket 8 containing, in the preferred embodiment, a radio relay in its nose section 9. Rocket 8 very rapidly rises to an optimum operating height, i.e., approximately 100,000 ft.; a height which increases the line of sight distance to distances obtainable with conventional equipment. At the optimum height the nose section 9 is ejected, a parachute 10 opens and the radio relay equipment in the nose section is energized. The parachute suspends the equipment for sufficient periods of time to permit either one or the other of stations 6 or 7 to transmit UHF signals to the relay equipment which will relay the transmitted intelligence to receiving stations beyond the normal line of sight up to ranges dependent on the height of the rocket carried relay station.

Figures 2, 3:
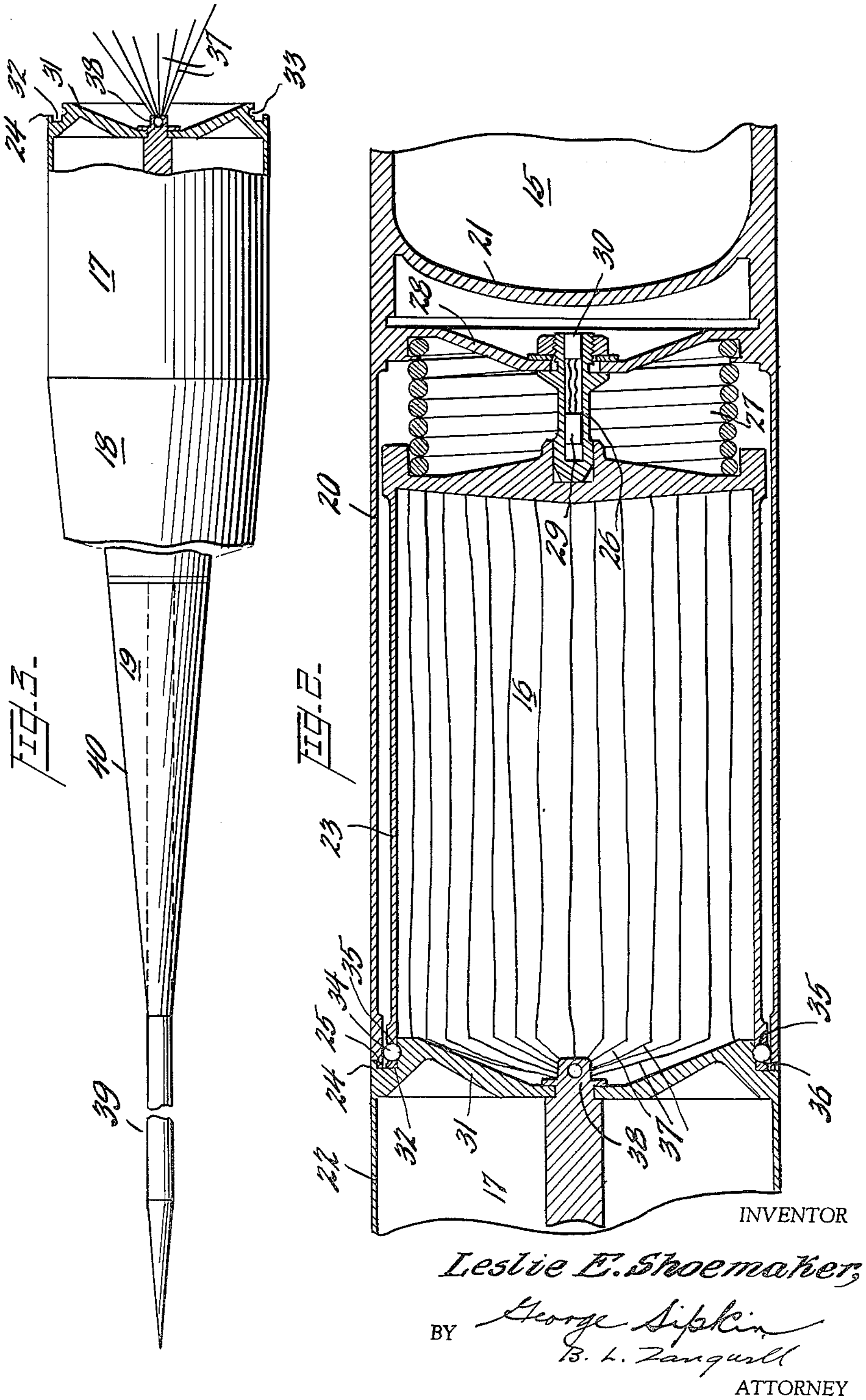
FIG. 2 shows in section the parachute containing portion of the rocket and a release mechanism employed.
FIG. 3 shows the rocket nose section and integral antenna.

Referring now to FIGS. 2 and 3 a rocket embodiment which may be employed to practice the invention is shown and comprises a propellant section 15, a parachute section 16, a power supply section 17, a nose cone 18, and an antenna section 19. The skin 20 of the propellant section forward of the reaction wall 21 extends to and is secured to the skin 22 of the power supply section 17 and also telescopically receives a parachute casing 23. Skin 20 is secured to the skin 22 of the power supply section by mating circumferential flanges 24 and 25 on the adjacent ends of skins 20 and 22, the skins cooperating with ball bearings to form a force fit. The propellant section 15 is also secured internally to the parachute casing 23 as by a hollow frangible stud 26 fastened by any suitable means at its ends to the parachute and propellant sections. A spring 27 is held compressed between casing 23 and the end wall 28 of section 15 about the hollow stud 26. Within the hollow stud is a squib 29 adapted to be detonated by an electrical signal from a suitable timing or position circuit 30. The parachute casing 23 is secured at its other end to an end plate 31 of the power supply section 17 and has formed therein an annulus 32 (FIG. 3). The outer wall of said annulus forming the circumferential flange 24 which cooperates with the mating circumferential flange 25 at the terminus of skin 20. The inner wall of the annulus has formed therein a plurality of circular depressions 33 adapted to receive in part a plurality of ball bearings 34. The terminal end of the parachute casing 23 (FIG. 2) fits into the annulus 32 and over its inner wall. A plurality of holes 35 having flared openings 36 are formed about the circumference of the terminal end of the parachute casing 23 and are adapted to be in alignment with depressions 33 in end plate 31. As seen in FIG. 2, the ball bearings 34, captivated between depressions 34 and skin 20 hold parachute casing 23 secured to end plate 31 and exert a force against skin 20 when assembled as shown to maintain skins 20 and 22, through flanges 24 and 25, secure.

In operation, when the rocket has reached a predetermined height, the timing or position circuit 30 is actuated when the trajectory of the rocket changes to send a signal to squib 29 which explodes breaking stud 26. At the time of fracture, spring 27 is released and ejects the parachute casing along with sections 17, 18 and 19 from the propellant section 15, thereby breaking the force fit between skins 20 and 22. Ball bearings 34 no longer constrained by skin 20 drop out and permit the parachute casing 23 to drop off thereby enabling the parachute 16 to open. The parachute guy lines 37 secured to a stud 38 in end plate 31 suspend sections 17, 18 and 19. The relay equipment in the nose section 18 is energized at this point by connection to the power supply through suitable timing or position circuitry and the equipment is in readiness.

The antenna section 19 of the rocket in a specific embodiment was a simple full wave dipole employing the rocket nose cone 18 as the ground element. Such an antenna met specifications as to vertical polarization and radiation pattern giving maximum intensity in the horizontal plane and sufficient intensity in the vertical. It being understood that station or ship borne antennae capable of radiating sufficient power in a vertical direction are also required. In FIG. 3, the antenna comprising a thin half wavelength rod 39 projects from the truncated nose cone section 18 and is encapsulated over a portion of its length in a dielectric material 40. The conical configuration of the nose cone section 18 results in a broad band ground element of substantially ½ wavelength and acts with the rod 39 to form a full wave dipole.

Should one way communication only be desired, the rocket described may be modified to carry a tape recording of the intelligence desired to be transmitted in the nose cone section 18 and, upon energization at the optimum height of the rocket, would cause the transmitter to be modulated by the information on the tape for transmission out over antenna 39 to a receiving station or stations. This embodiment is also highly advantageous as an emergency communication system utilizing conventional radio frequencies where radio silence of the launching station is mandatory and where the launching station, in order to avoid detection, cannot remain in one position long enough to transmit or in a media capable of supporting radio transmissions.

Figure 4:
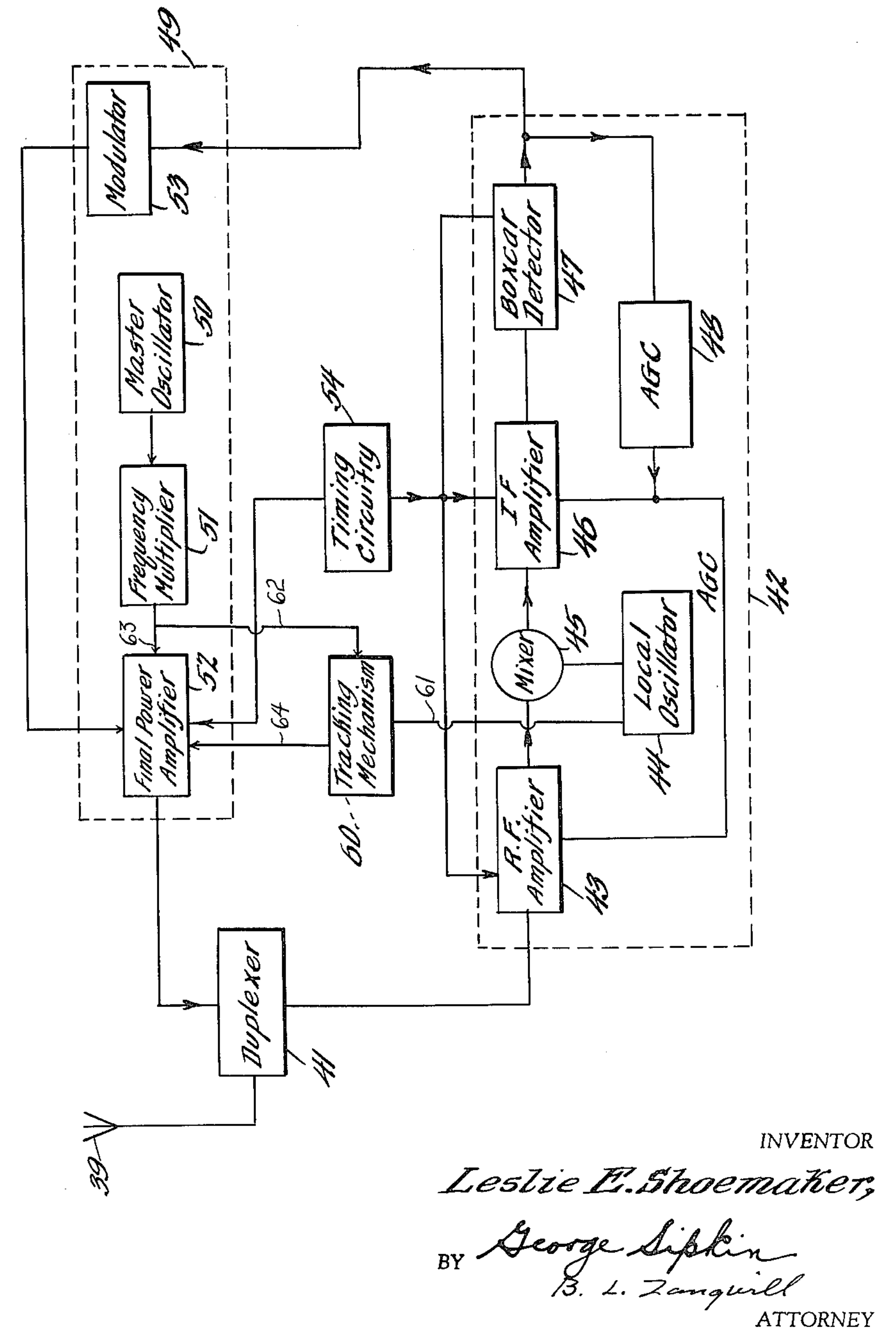
FIG. 4 is a block diagram of a relay equipment carried in the nose section of the rocket.
Figure 5:
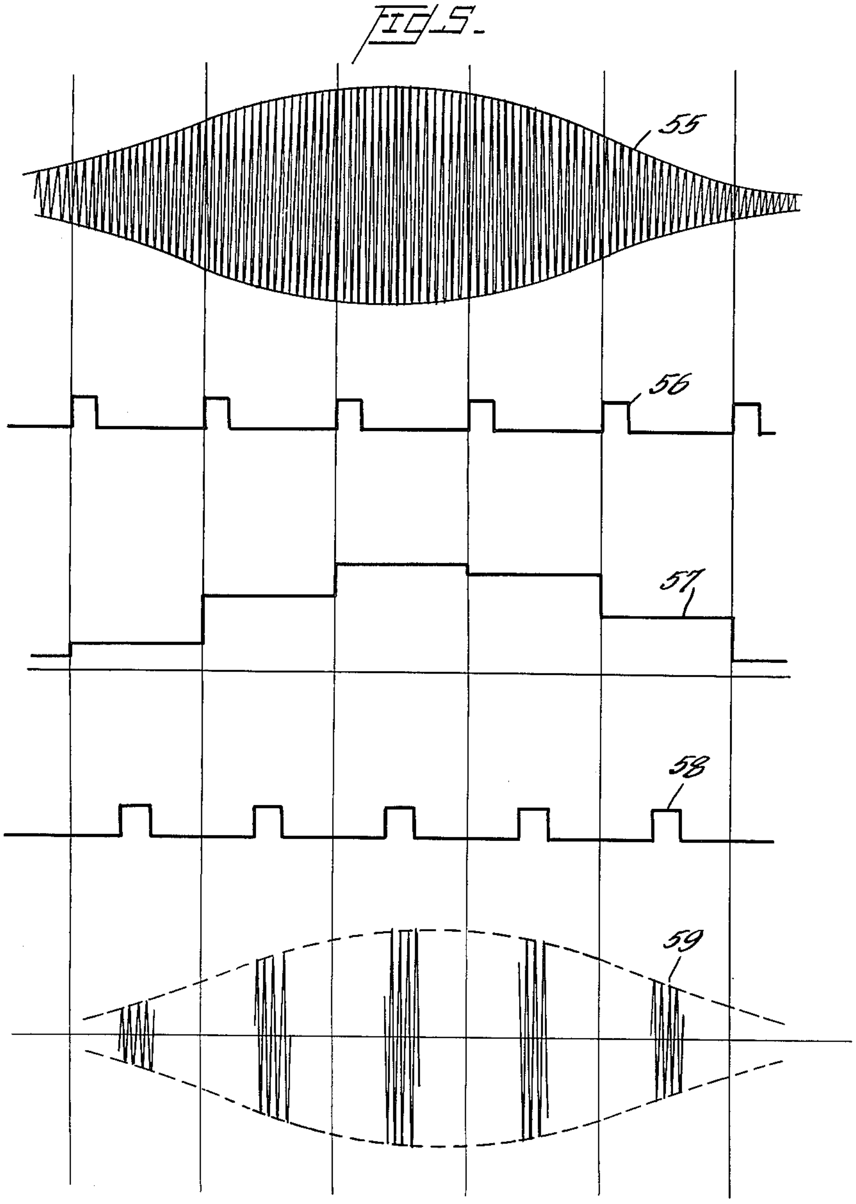
FIG. 5 shows waveforms explanatory of the operation of the relay equipment.

Referring now to FIGS. 4 and 5 which show a preferred embodiment of a radio relay equipment adapted to be housed in nose cone section 18, there is shown a block diagram of a time sharing receiver and transmitter. A time sharing system is preferred because it permits transmission and reception by the relay to be accomplished on one frequency while eliminating cross modulation through intermittent operation of the transmitter and receiver, and also permits the final amplifier to be pulse modulated so as to achieve greater peak power. However, it is to be understood that dual frequency systems may be utilized as well.

Signals sent by either of stations 6 or 7 are received by antenna 39 and fed through a T-R box or duplexer 41, the function of which is well known to the art, and to a receiver generally designated in dotted block 42 which is essentially a conventional superheterodyne receiver comprising RF amplifier stages 43, a local oscillator 44 and mixer 45, IF amplifier stages 46 and a detector 47; the receiver employing also automatic gain control 48.

The transmitter section of the relay shown in dotted block 49 comprises a stable oscillator 50, a frequency multiplier 51, and a power amplifier 52 connected to the antenna. A modulator 53 connected to the output of the receiver 42 conveys the intelligence to the final power amplifier 52 wherein it modulates the RF carrier.

A timing circuit 54, which may be a conventional delay multivibrator for generating receiver enabling and transmitter pulses 56 and 58 is connected to the power amplifier in the transmitter and to the RF, IF and detector circuits in the receiver.

The receiver 42 is normally biased to cutoff and is sensitized for reception of incoming intelligence by enabling pulses 56 from timing circuit 54 which are spaced by intervals greater than their width. The output of the IF amplifier 46 is a train of video pulses whose envelope is the audio intelligence modulated on the incoming RF signal. These pulses are detected by a conventionel boxcar detector 47 which stretches the pulses over the intervals between successive pulses and thereby develops a continuous staircase output 57, the levels of which correspond to the amplitude of the RF pulses detected. This staircase output 57 is fed to the modulator 53 which supplies sufficient power at the modulating frequency to amplitude modulate the carrier from oscillator 50 which has been multiplied to the same frequency as the received carrier. Transmitter enabling pulses 58 delayed from the receiver enabling pulses 56 a predetermined interval greater than a pulse width energize the final power amplifier 52 of transmitter 49 to cause transmission of amplitude modulated information bearing relay pulses 59 at a time when receiver 42 is disabled; the width of pulses 59 being wide enough so that standard shipboard receivers can be used.

It may be seen therefore that the system described provides a rapid method of initiating communications in an emergency where conventional communication is not possible and a method of communication in high latitude regions where normal communication is rarely possible.

In the embodiment employing a recording of the intelligence to be transmitted, the record may be substituted for the receiver section 42 and be connected to the modulator 53.

The device disclosed may also be utilized as a jamming device in enemy waters by adapting it to scan a band of frequencies through a tracking mechanism 60. The tracking mechanism 60 may comprise a low frequency oscillator, continuously variable with the local oscillator 44 over the band of frequencies to be covered by conventional means which is ganged to the low frequency oscillator and to the local oscillator 44 through a mechanical linkage 61. When employed thus as a jammer, lead 62 will be substituted for lead 63 and the output of frequency multiplier 51 after heterodyning with the low frequency oscillator to a new carrier frequency will be applied to the final power amplifier 52 through lead 64. It can be seen therefore that the transmitter will track the receiver and transmit received signals back to mask or jam receivers within its range.

Obviously many modifications and variations of the present invention are possible in the light of the above teachings. It is therefore to be understood that within the scope of the appended claims the invention may be practiced otherwise than as specifically described.

What is claimed is:

1. An emergency communication rocket comprising a propellant section having an extended skin on the forward end thereof; a radio relaying device having an antenna attached to its forward end and a parachute attached to the rear end, a cylindrical parachute casing smaller in diameter than said extended skin adapted to contain said parachute and slide inside said extended skin and means for temporarily fastening said radio relaying device to said casing and said extended skin.

2. An emergency communication rocket according to claim 1 but further characterized by said temporary fastening means comprising an annulus having a plurality of depressions formed along its outer edge formed as part of the rear of said radio relaying device, said casing having a plurality of holes adapted to fit over said depressions, said extended skin extending around said casing and over said depressions, and a plurality of balls adapted to be mounted in said depressions to hold said skin by means of a force fit and to hold said casing by extending through said holes.

3. An emergency communication rocket comprising a propellant section having an extended skin on the forward end thereof, a radio relaying device having an antenna attached to its forward end and a parachute attached to the rear end, a cylindrical parachute casing having a diameter smaller than said extended skin adapted to fit inside said extended skin and to contain said parachute, means for temporarily fastening said casing and extended skin to said relaying device, and means for separating said extended skin from said relaying device comprising a compression spring compressed between said casing and said propellant section fastened by means of a frangible stud connected between said casing and said propellant section, said stud adapted to be broken by a control mechanism.

4. A rocket for emergency communication between two distant stations on the earth's surface comprising a propellant section and a streamlined nose section detachably connected to said propellant section comprising a half wave antenna rod having one end forming the forward end of said rocket and the other end extending back along the length of said rocket, a frusto-conical shaped, half wave ground element connected by its smaller end to the other end of said rod and extending back along the length of said rocket to its larger end, said ground element containing a radio relay, and a foldable parachute connected to the larger end of said ground element for suspending said nose section near the apogee of flight of said rocket with said nose pointed toward the earth's surface whereby a uniform radiation pattern may be obtained from said nose section at the minimum grazing angle.

5. A nose cone antenna according to claim 4 but further characterized by a streamlined dielectric coating on said rod extending from said frusto-conical shaped half wave ground element along at least a part of said rod whereby a streamlined nose shape is obtained for said rocket.

References Cited in the file of this patent

UNITED STATES PATENTS

| | | |
|---|---|---|
| 806,052 | Blackmore | Nov. 28, 1905 |
| 1,888,777 | Stein | Nov. 22, 1932 |
| 2,269,900 | Bickel | Jan. 13, 1942 |
| 2,360,912 | Unterberg | Oct. 24, 1944 |
| 2,397,088 | Clay | Mar. 26, 1946 |
| 2,413,621 | Hammond | Dec. 31, 1946 |
| 2,498,635 | Bailey | Feb. 28, 1950 |
| 2,551,609 | Kohr et al. | May 8, 1951 |
| 2,573,401 | Carter | Oct. 30, 1951 |
| 2,598,064 | Lindenblad | May 27, 1952 |
| 2,626,348 | Nobles | Jan. 20, 1953 |
| 2,629,083 | Mason et al. | Feb. 17, 1953 |
| 2,655,649 | Williams | Oct. 13, 1953 |
| 2,706,773 | Dodington | Apr. 19, 1955 |
| 2,770,722 | Arams | Nov. 13, 1956 |